United States Patent
Gowda et al.

[11] Patent Number: 6,115,066
[45] Date of Patent: Sep. 5, 2000

[54] IMAGE SENSOR WITH DIRECT DIGITAL CORRELATED SAMPLING

[75] Inventors: Sudhir Muniswamy Gowda, Ossining, N.Y.; Hyun Jong Shin, Ridgefield, Conn.; Hon-Sum Philip Wong, Chappaqua, N.Y.; Peter Hong Xiao, San Jose, Calif.; Jungwook Yang, Nyack, N.Y.

[73] Assignee: International Business Machines Corporation, Armonk, N.Y.

[21] Appl. No.: 08/876,694

[22] Filed: Jun. 12, 1997

[51] Int. Cl.[7] .................................................. H04N 5/335
[52] U.S. Cl. ........................................... 348/308; 348/241
[58] Field of Search .................................. 348/207, 241, 348/243, 248, 294, 302, 303, 304, 307, 308, 300, 301; 250/208.1; H04N 5/217

[56] References Cited

U.S. PATENT DOCUMENTS

| | | | |
|---|---|---|---|
| 5,434,619 | 7/1995 | Yonemoto | 348/241 |
| 5,793,423 | 7/1999 | Hamassaki | 348/302 |
| 5,926,214 | 7/1999 | Denyer et al. | 348/241 |

*Primary Examiner*—Tuan Ho
*Attorney, Agent, or Firm*—F. Chau & Associates, LLP

[57] ABSTRACT

A CMOS image sensor is provided in which correlated double sampling is performed entirely in the digital domain. In an exemplary embodiment, the image sensor includes a plurality of imager cells arranged in rows and columns, where the imager cells of a particular column are coupled to a column data line of that column. Each active imager cell is capable of selectively providing a first output on an associated column data line indicative of a reset level during a first sampling interval. During a second sampling interval, each active imager cell provides a signal output on the associated column data line indicative of an amount of light incident upon that imager cell. At least one analog to digital (A/D) converter is coupled to the column data lines and converts the first and signal outputs on each column data line to first and second digital codes, respectively, to complete a correlated double sampling operation. The invention eliminates the need for analog capacitors to store the reset and signal levels.

19 Claims, 6 Drawing Sheets

IMAGE SENSOR WITH DIRECT DIGITAL CORRELATED SAMPLING

CROSS REFERENCE TO RELATED APPLICATIONS

This application is related to the following copending U.S. patent applications: Ser. No. 08/873,610, entitled IMAGE SENSOR PIXEL CIRCUIT; Ser. No. 08/873,539, entitled IMAGE SENSOR WITH DUMMY PIXEL OR DUMMY PIXEL ARRAY; and Ser. No. 08/873,537, entitled CORRELATED DOUBLE SAMPLING WITH UP/DOWN COUNTER, all of which are by the same inventors as this application, filed on the same day as this application, assigned to the assignee herein and expressly incorporated herein by reference.

FIELD OF THE INVENTION

This invention relates generally to image sensors. More specifically, the present invention relates to a complementary metal oxide semiconductor (CMOS) image sensor with direct digital correlated double sampling circuitry.

BACKGROUND

With the advent of multimedia communications, there arises the need for low cost solid state image sensors to complement computers and communication devices to realize practical videotelephones and the like. The image input device is central to any teleconferencing and multimedia application. Recently, CMOS image sensors have been recognized as a viable candidate for the image input device. CMOS image sensors also have utility in other fields such as robotics, machine vision and automotive applications. An important advantage of CMOS image sensors (or imagers) is that signal processing circuits can be readily integrated on the same chip as the imager, thus enabling the design of smart, single-chip camera systems. CMOS imagers are inherently lower cost than conventional charge coupled devices (CCDs) because they can be manufactured in conventional, widespread CMOS fabrication lines without any process modification.

Figure 1:
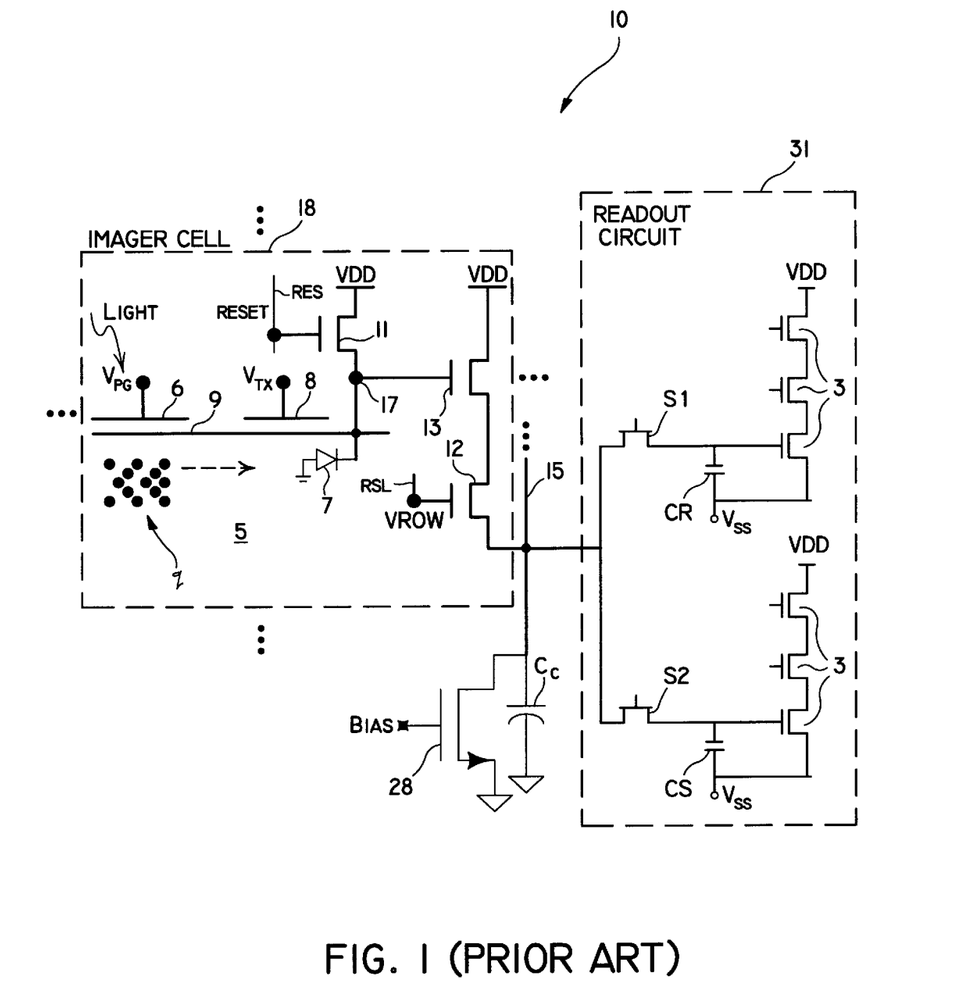
FIG. 1 schematically illustrates a prior art image sensor and pixel circuit.

FIG. 1 schematically illustrates one example of prior art active-pixel CMOS imager circuitry. Imager 10 is single-stage image sensor as disclosed in an article by Mendis et al., entitled "A 128×128 CMOS Active Pixel Image Sensor for Highly Integrated Imaging Systems", IEEE Electron Devices Meeting, p. 583, 1993. A MOS photogate 6 is employed as the light sensitive element in each pixel (imager cell) 18. The transistors within each pixel 18 are typically NMOSFETS. The overall imager 10 is considered a CMOS imager since CMOS electronics are used in conjunction with the imager cells. For example, the transistors 3 within readout circuit 31 are typically PMOSFETS. As shown in the simplified block diagram of FIG. 2, imager 10 includes a plurality of such cells 18 arranged in an array of rows $R_1$–$R_M$ and columns $C_1$–$C_N$. Typically, only one row at a time is activated for image charge readout from all the cells 18 in that row. Timing and control logic 14 provides row select signals (VROW) on row select lines $RSL_1$–$RSL_M$ to select the active row. RESET pulses on lines $RES_1$ to $RES_M$ are also generated by logic block 14 for application to cells 18. The light-induced charge from each activated cell is read out as a corresponding voltage on one of column buses $15_1$ to $15_N$, each of which is connected to the cells 18 in respective columns $C_1$ to $C_N$. The voltage on each line $15_i$ corresponds, at any given time, to the image charge of only one activated cell in the associated column $C_i$ and activated row. Readout circuits $31_1$ to $31_N$ read out the voltage of the activated cell in the corresponding column $C_1$–$C_N$. A load transistor 28 is utilized on each column bus. Capacitance Cc represents the bus line capacitance. Bus lines $19_1$ to $19_M$ carry voltages VDD, $V_{PG}$ and $V_{TX}$ to the respective cells 18. Processing/image storage electronics 16 receives the voltages from the readout circuits for storage in memory and subsequent processing and display. Logic blocks 14 and 16, which are clock synchronized, include CMOS electronics.

As shown in FIG. 1, within each cell 18 photo-charge "q" collected under photogate transistor 6 is transferred through a dc-biased transfer gate transistor 8 to a floating diffusion diode 7 formed beneath substrate surface 9. This floating diode 7 is periodically dc-restored by the application of a logic high RESET pulse to the gate of reset FET 11, thus resetting the potential of diode 7 (i.e., at circuit node 17) to a voltage determined by the threshold voltage of FET 11 and the power supply voltage (VDD). Following each diode reset cycle, the photo-charge is transferred to floating diode 7. The voltage on diode 7 then corresponds to the intensity of light incident upon the associated imager cell 18. This voltage sets the potential of the gate of source follower FET 13, which amplifies or buffers the voltage appearing at its gate terminal for subsequent readout. When row select transistor 12 is turned ON by a VROW pulse on row select line RSL, the voltage at circuit node 17 is detected by readout circuit 31 detecting corresponding voltage on column bus 15.

The reset noise is removed by a variation of the correlated double sampling (CDS) technique as disclosed in an article by White et al., entitled "Characterization of Surface Channel CCD Image Arrays at Low Light Levels", IEEE Journal of Solid State Circuits, vol. SC-9, p.1, 1974. When used in CMOS image sensors, this correlated double sampling technique effectively removes the fixed pattern of noise of the image sensor arising from offset errors due to transistor mismatches in manufacturing. To remove reset noise of reset switch 11, the reset level measured on column bus 15 is subtracted from the signal level on the column bus, where the reset level is obtained just prior to the transfer of photo-charge to diode 7. As such, any offset errors due to transistor mismatches is canceled since both levels are measured at the same circuit point. In the embodiment of Mendis et al., the reset level and the signal level are stored on two separate sample and hold capacitors CR and CS, via two separate switches S1 and S2, respectively. Two identical readout circuit portions are required, one for the reset level, and one for the signal level. Further differential amplification at the multiplexed column output (within circuit block 16) is required to complete the reset noise removal operation.

Figure 2:
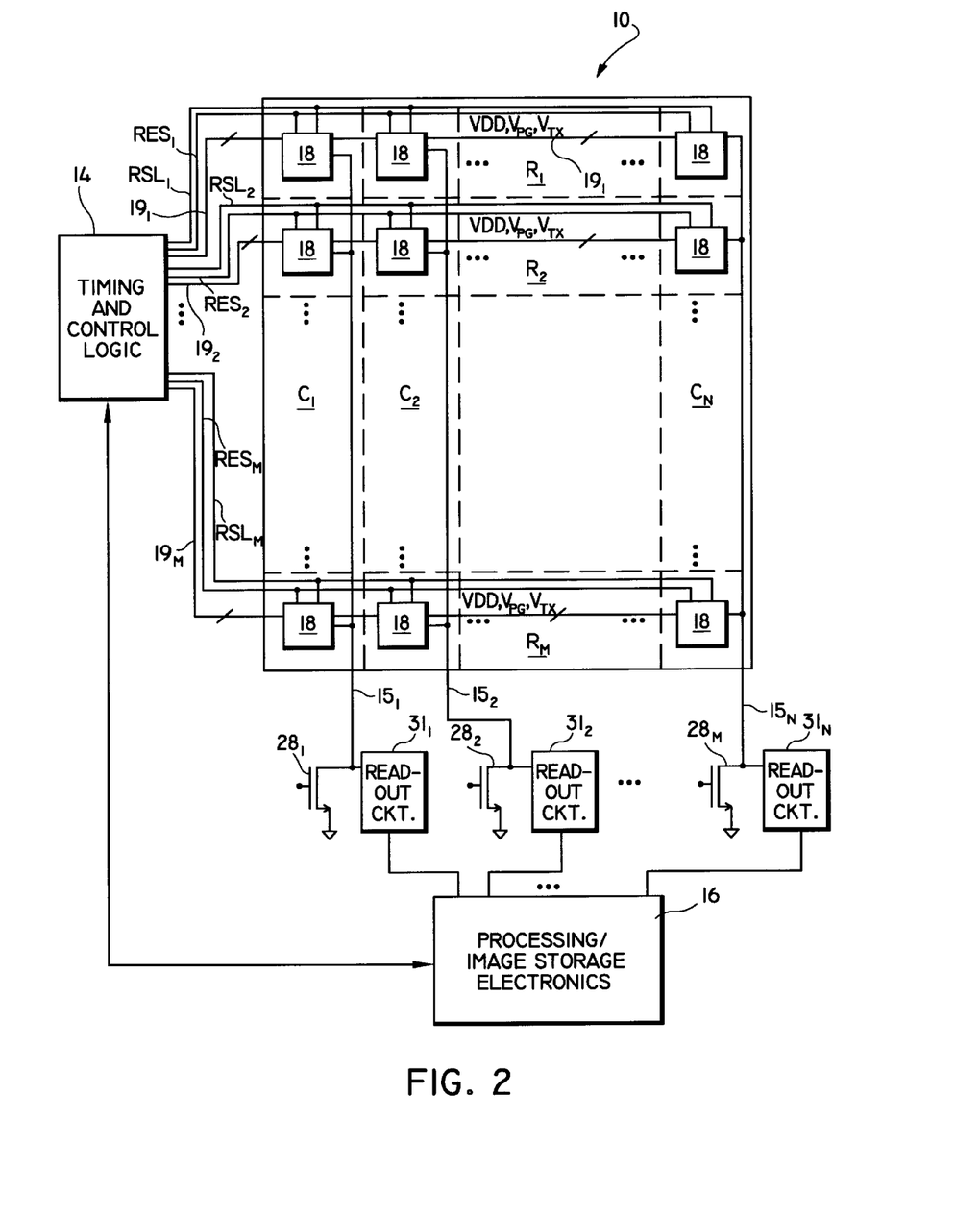
FIG. 2 is a schematic block diagram of a prior art image sensor including a sensor array and associated electronics.

One drawback of the Mendis-type imager 10 of FIGS. 1 and 2 is that the CDS operation is performed in the analog domain, using capacitors CR and CS to temporarily store the reset and signal samples, respectively. These analog circuits are susceptible to noise and gain errors, reducing the accuracy of the image data. In addition, the capacitor CR used to store the reset sample must have a large area to minimize noise. Accordingly, there is a need to overcome these deficiencies.

SUMMARY OF THE INVENTION

The present invention relates to a CMOS image sensor in which correlated double sampling is performed entirely in the digital domain.

In an exemplary embodiment, the image sensor includes a plurality of imager cells arranged in rows and columns, where the imager cells of a particular column are coupled to a column data line of that column. Each active imager cell is capable of selectively providing a first output on an associated column data line indicative of a reset level (including reset noise) during a first sampling interval. During a second sampling interval, each active imager cell provides a signal output (including noise) on the associated column data line indicative of an amount of light incident upon that imager cell. At least one analog to digital (A/D) converter is coupled to the column data lines and converts at least the first output on each column data line to a first digital code, to enable a subsequent comparison with a second digital code associated with the signal output to complete a correlated double sampling operation, whereby errors due to noise and transistor mismatches are removed.

A set of digital registers may be coupled to the at least one A/D converter to store the first digital code for subsequent transfer to comparison circuitry that subtracts the value corresponding to the first digital code with the value corresponding to the second digital code, to provide an image data output with noise removed. For example, one A/D converter may be employed at the bottom of each column, with a register coupled to each A/D converter. Preferably, the one or more A/D converters also convert the signal outputs to the respective second digital codes during the second sampling interval.

Advantageously, the present invention eliminates the large analog capacitors used in prior art CMOS image sensors along with the associated noise and gain errors.

BRIEF DESCRIPTION OF THE DRAWINGS

Preferred embodiments of the present invention are described herein with reference to the drawings, in which like reference numerals identify similar or identical components throughout the several figures, wherein.

DETAILED DESCRIPTION OF THE PREFERRED EMBODIMENTS

Figure 3:
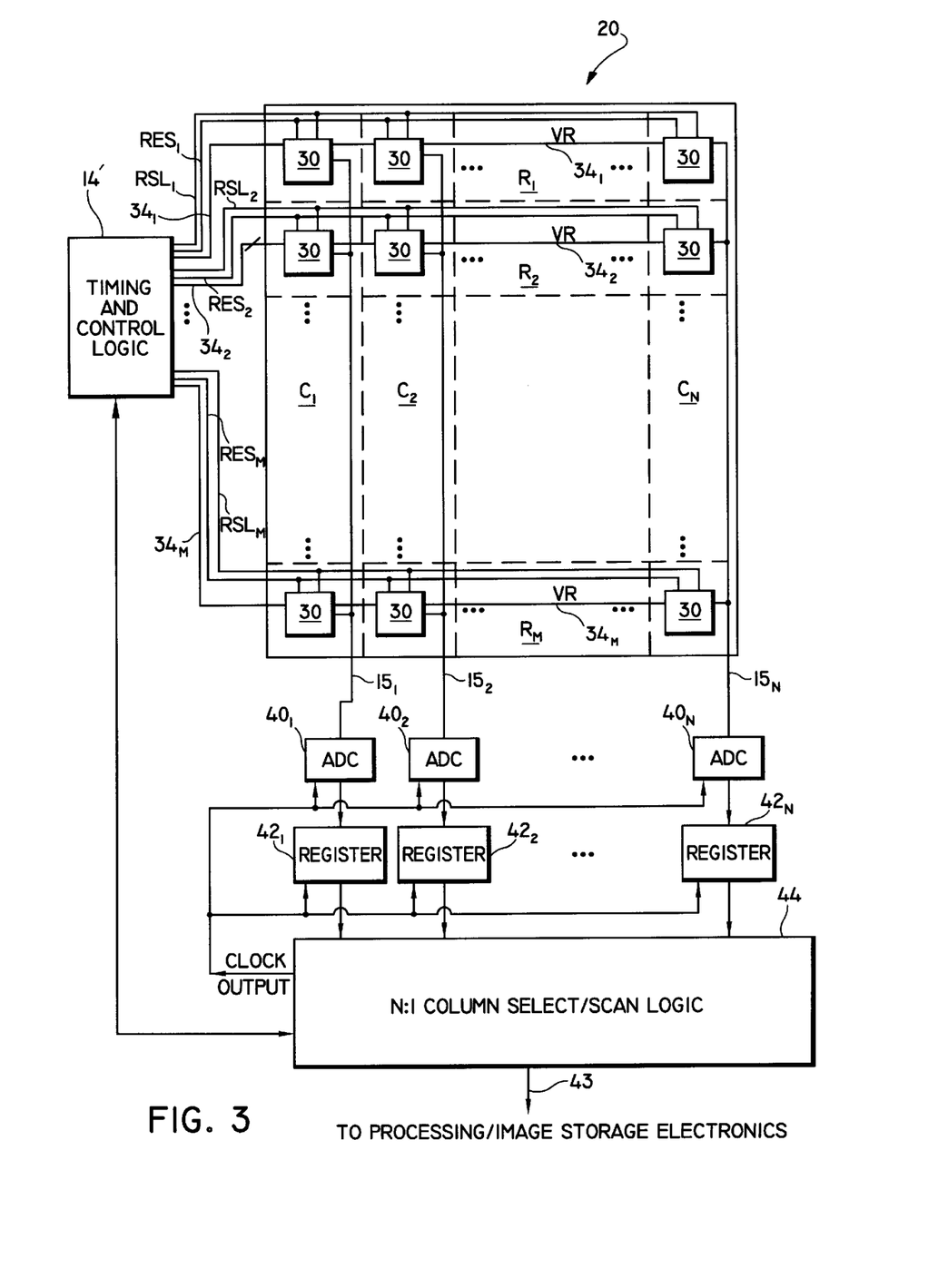
FIG. 3 is a schematic block diagram of an image sensor in accordance with the present invention.

FIG. 3 schematically illustrates an exemplary embodiment of an image sensing device in accordance with the present invention, designated as 20. Device 20 includes a plurality of imager cells (pixels) 30 arranged in M rows $R_1$ to $R_M$ by N columns $C_1$ to $C_N$. A key difference between image sensor 20 and the prior art image sensor discussed above is that analog to digital converters (ADC) $40_1$ to $40_N$ are utilized at the bottom of respective columns $C_1$ to $C_N$ in place of the analog readout circuits. A/D converters $40_1$–$40_N$ directly convert the reset level and signal level on the respective column buses $15_1$ to $15_N$ to digital values, which are then stored in registers $42_1$–$42_N$. The data stored in the registers are transferred to logic block 44 which includes processing/subtraction circuitry to subtract the reset levels from the corresponding signal levels to complete a correlated double sampling operation. As a result, since noisy analog capacitors to store the reset and signal levels are obviated, the accuracy of the correlated double sampling is improved. In addition, the size of the overall imager can be reduced via the elimination of the large analog capacitors CR and CS at the bottom of each column.

In the embodiment shown in FIG. 3, one A/D converter is utilized for each column. In the alternative, by incorporating a column select switch (not shown) on each column line $15_1$–$15_N$, a smaller number of A/D converters 40 can be utilized, where each A/D converter would be tied to multiple column lines 15. Even the case of one A/D converter for the entire image sensor chip is feasible.

Figure 4:
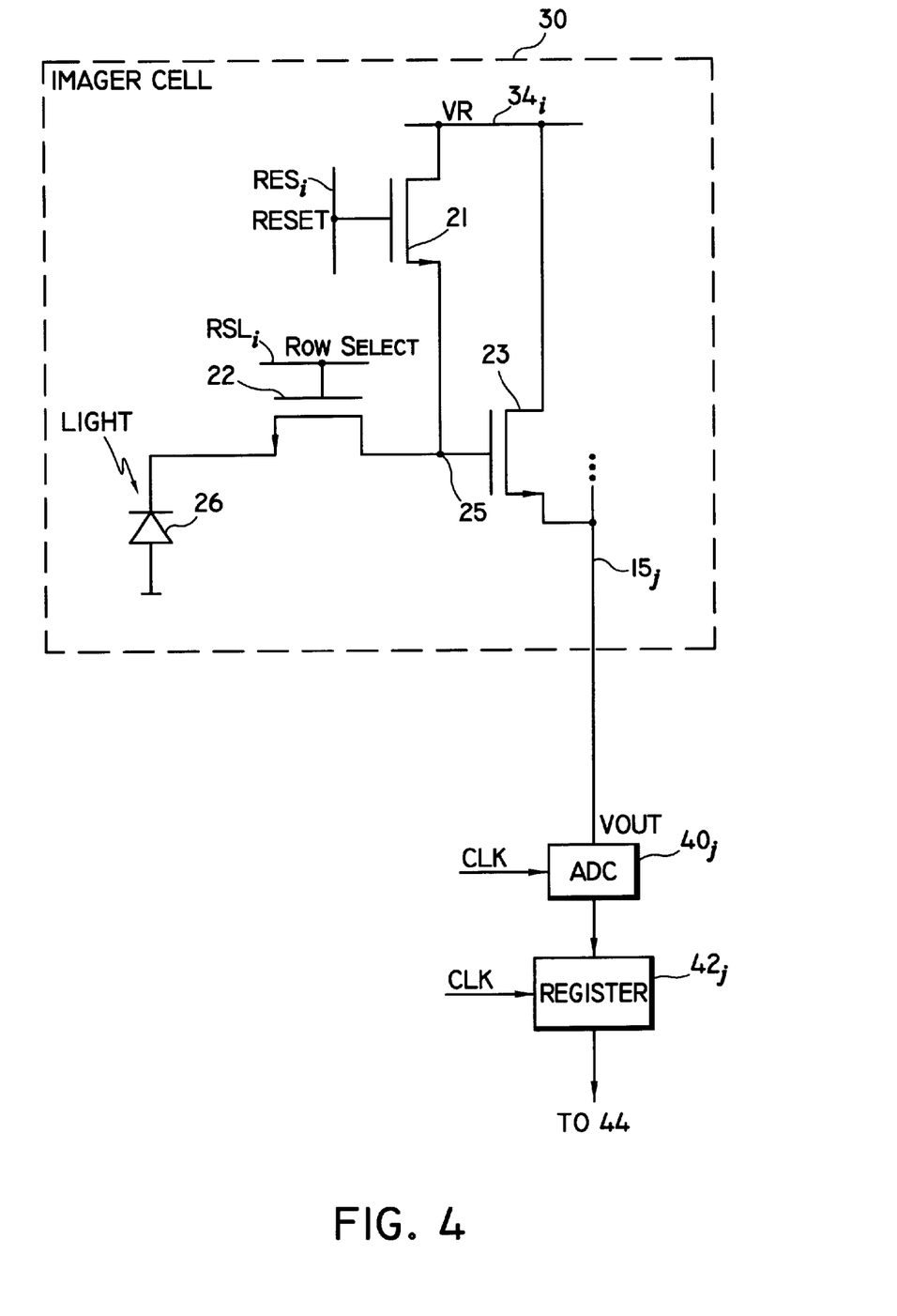
FIG. 4 illustrates an imager cell that may be used in the image sensor of FIG. 3.

FIG. 4 schematically illustrates pixel circuitry for an exemplary imager cell 30 of image sensor array 20 in the "ith" row $R_i$ and the "jth" column $C_j$. This imager cell is one of those disclosed in our commonly assigned, copending U.S. patent application Ser. No. 08/873,610, entitled IMAGE SENSOR PIXEL CIRCUIT, filed concurrently herewith, the subject matter of which is incorporated herein by reference (hereafter, the "H. Wong et al. I" application). Imager cell 30 is an improvement over the prior art cell of FIG. 1, in that the large row select MOSFET 12 is eliminated, thereby allowing more space for the photosensitive element, in this case, photodiode 26. In addition, less bus lines are required, which likewise creates more space for the photosensitive element. Only three bus lines—RESET line $RES_i$, VR line $34_i$ and Row Select line $RSL_i$—are connected to the imager cells 30 of a common row $R_i$. Hence, with the imager cell 30 of FIG. 4, imager 20 can exhibit improved resolution over the prior art by utilizing the extra space created to provide a larger area for the photosensitive element and/or reduce the overall pixel size.

The pixel circuit of cell 30 eliminates the separate row selection transistor by employing FET 22 to perform both a charge transfer function and a pixel selection function. The row select line $RSL_i$ connects directly to the gate of FET 22. In addition, the pixel selection function is carried out in conjunction with reset transistor 21. As such, reset transistor 21 is functionally different from reset transistor 11 of FIG. 1, which, in the prior art, was used strictly for resetting the reference circuit node 17 (readout node). In the prior art, the bus line RES connecting the gate of FET 11 to timing and control logic 14 is typically tied to multiple rows, whereby the cells of multiple rows are reset together. In the embodiments disclosed herein, each reset bus RES is dedicated for a single row and is not tied to multiple rows, thereby enabling the reset device 21 to perform a partial pixel selection function as well as a reset function.

FET 21 operates to reset the reference circuit node 25 to nearly the voltage level VR on bus line $34_i$ when the RESET signal on the $RES_i$ bus is pulsed. Specifically, the node 25 voltage is reset to $VR-V_{DS21}$, where $V_{DS21}$ is about the same as the threshold voltage $V_{TH}$ of FET 21, typically about 0.4–0.5 volts. As will be explained more fully below, following the application of the RESET pulse, the voltage at reference node 25 is indicative of the reset level (including noise) during a first sampling time interval in which charge transfer device 22 is OFF. During a second sampling interval in which device 22 is ON, the reference node 25 voltage is indicative of photocharge collected by photodiode 26, and hence, the intensity of light incident upon cell 30. The gate of FET 22 is tied to the $RSL_1$ line to receive the ROW SELECT signal. In the prior art, the RSL line is tied to the separate MOSFET 12. With imager cell 30, the relatively small charge transfer FET 22 performs a partial pixel selection function formerly performed by the large MOS- FET 12. Source follower FET 23 is used to buffer the voltage at reference node 25 and transfer an output voltage related to the photocharge to column data line $15_j$. At any given time, only one pixel 30 per column is active, as controlled by both the ROW SELECT signal and the RESET signal. As such, the voltage provided on column bus $15_j$ to associated ADC $40_j$ is directly related to the voltage on reference node 25 of the active pixel.

Figure 5:
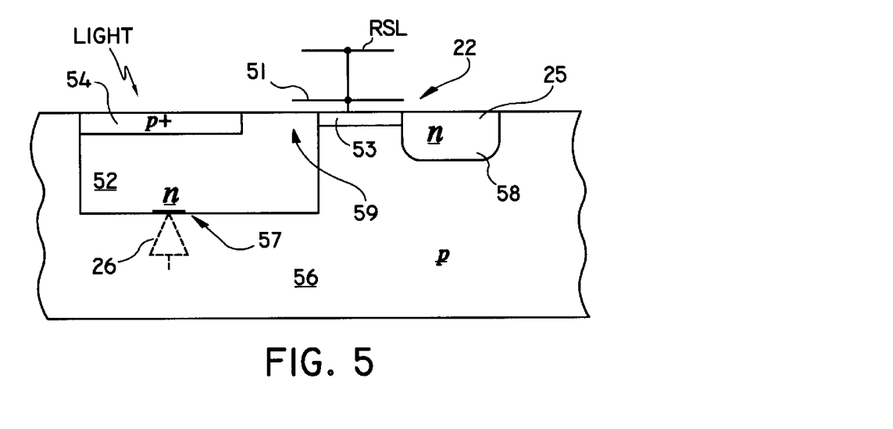
FIG. 5 is a cross section of a portion of the imager cell of FIG. 4.

FIG. 5 shows a cross section of the physical structure of photodiode 26 adjacent FET 22. Photodiode 26 and FET 22 are formed in a common p type substrate 56. (FETS 21 and 23 are also formed in substrate 56). Each of FETS 21, 22 and 23 are NMOSFETS in the shown embodiment; however, PMOSFETS may alternatively be utilized. An n type region 52 is shared between photodiode 26 and FET 22. The top region 59 within region 52 forms the source (or alternatively, the drain) of FET 22. The diode 26 is formed by means of the p-n junction 57 between region 52 and substrate 56. FET 22 has n type channel 53 and drain regions 58 and gate metallization 51 connected to row select line RSL. Photodiode 26 may be either a simple p-n diode or a pinned diode such as described in an article by B. Burkey et al., entitled "The Pinned Photodiode for an Interline-Transfer CCD Image Sensor," International Electron Devices Meeting, p. 28, 1984. In the pinned diode case, a thin p+ layer 54 is formed on the substrate surface atop n well 52.

In any event, image sensor 20 of FIG. 2 may alternatively utilize other pixel circuit configurations for the imager cells 30 used in conjunction with A/D converters 40. The present invention is not limited to an image sensor using the imager cell of FIG. 4. In essence, any pixel circuit which allows the separate sampling of the reset and signal samples can be used within the image sensor 20 of the present invention. For example, any of the other pixel circuit configurations disclosed in the H. Wong et al. I patent application cited above, may be used in conjunction with A/D converters 40. That patent discloses various modifications to the pixel circuit of FIG. 4 herein, such as: employing a phototransistor in place of photodiode 26; including an anti-blooming transistor within each cell; and including a shutter transistor within each cell to perform electronic shuttering. The Mendis et al. pixel circuit shown in FIG. 1 herein can also be used, although this configuration is not preferred as discussed above.

Figure 6:
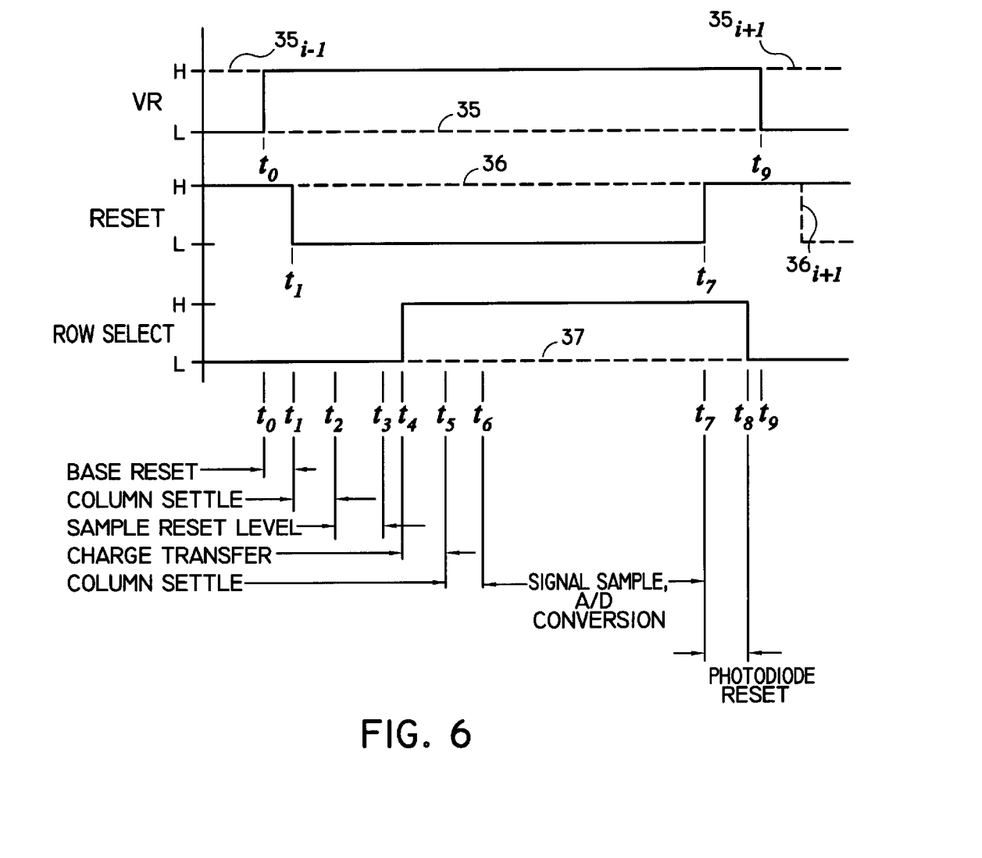
FIGS. 6 and 7 are timing diagrams of waveforms applied to the image sensor cells of FIG. 3.

Operation of image sensor 20 of FIG. 3 (with imager cells 30 of FIG. 4) will now be described in conjunction with the timing diagram of FIG. 6. The solid lines of the VR, RESET and ROW SELECT waveforms in the diagram represent the waveforms applied to the active pixel 30 of column $C_j$. The dotted lines 35–37 represent the respective waveforms applied to inactive pixels 30 in that column (i.e., inactive during the time interval from time $t_0$ to $t_9$). The ensuing discussion pertains to the active pixel. The time prior to time $t_0$ represents a photocharge collection period for all the pixels in a row (e.g., for the "ith" row, $R_i$). In this period, VR is low, RESET is high, and ROW SELECT is low. "High" potential for the various waveforms discussed herein is typically 1.2, 1.8, 2.5, 3.3 or 5 volts; "low" is typically zero volts. Photocharge is collected in the photodiode during the photocharge collection period and the potential of photodiode 26 (i.e., the potential of n well 52 relative to substrate 56) is lowered corresponding to the amount of photocharge collected. Since ROW SELECT is low, FET 22 is OFF and the photocharge does not get transferred out during this time. Also, RESET is high, turning FET 21 ON, whereby reference node 25 is set at VR, which is low. As such, the gate of FET 23 is low, turning FET 23 OFF, such that no voltage from that pixel is put on column bus $15_j$. Meanwhile, VR is high for the pixels 30 in the preceding row $R_{i-1}$ as indicated by waveform portion $35_{i-1}$, to permit data readout from the pixels in that row.

At time $t_0$, VR applied to the pixels 30 of row $R_i$ is raised, whereupon a "base reset/read" period commences to set a base reference level at reference node 25 and read out the same. When VR is high, reference node 25 is set to a high potential since FET 21 is still ON. The RESET signal is then brought to low at time $t_1$, e.g., five microseconds after time $t_0$, isolating reference node 25 from the VR bus $34_j$. Due to parasitic gate to source capacitance of the reset FET 21, noise on the RES (clock) line feeds through to reference node 25. As such, this "clock feedthrough" due to RESET going low is also stored in circuit node 25. When RESET is brought low at time $t_1$, the potential of node 25 remains close to its previous value when RESET was high due to the capacitance between reference node 25 and the substrate potential. The node 25 potential is then sampled through source follower FET 23, which provides the voltage VOUT on column bus $15_j$ at a value directly related to the reference node 25 voltage. After an appropriate "column settle" time between $t_1$ and $t_2$, VOUT is sampled and converted to a digital codeword by A/D converter $40_j$ between times $t_2$ and $t_3$ (first sampling interval). The digital codeword is transferred to digital register $42_j$ for temporary storage. This codeword corresponds to the reset value (including noise) for a subsequent correlated double sampling operation. All A/D converters 40 and registers 42 receive clock inputs from N:1 column select/scan logic 44 to control the timing of A/D conversion and data transfer from the A/D converters to the registers 42 and from registers 42 to other storage registers within logic block 44. Timing and control logic 14' which is modified from the prior art to provide the control waveforms described herein is clock synchronized with logic block 44 to facilitate proper data readout.

It is noted that sampling is avoided during the column settle interval ($t_1$ to $t_2$) to avoid sampling transient noise associated with the reset FET 21 being rapidly turned off. The column settle interval $t_1$–$t_2$ may be, e.g., one microsecond.

During the time interval immediately following time $t_1$, it is important that no voltage is put on the column bus by the pixels in the other rows, which would otherwise diminish accuracy of the reset and signal data readout from the active pixels. As such, the VR, RESET and ROW SELECT signals applied to the inactive pixels are low, high and low, respectively, as indicated by respective waveform portions 35, 36 and 37. The source follower FET 23 of the inactive pixels will then be off during this time. As such, the output voltage provided on each column bus as $15_j$ corresponds only to the reference node 25 voltage of the active pixel 30 in that column.

A charge transfer interval for the active pixels commences at time $t_4$ by raising ROW SELECT to row $R_i$. This turns on the charge transfer FET 22 of the pixels 30 in row $R_i$, thereby allowing the charge collected in photodiode 26 to be shared among the photodiode capacitance and the capacitance at reference node 25. The potential of reference node 25 will fall corresponding to the amount of electrons collected in photodiode 26. VOUT will fall corresponding to the reference node 25 potential. The charge transfer interval is typically on the order of two microseconds. After a second column settle interval between time $t_5$ and $t_6$ (e.g., one microsecond) VOUT is again sampled and digitized by A/D converter $40_j$ between time $t_6$ and $t_7$ (second sampling interval). The value of VOUT during this interval is the "signal" value (including noise) corresponding to the node 25 voltage, which corresponds to the amount of light incident upon the active pixel 30. The digitized value (second digital codeword) is outputted by A/D converter 40$_j$ for storage in register 42$_j$. The first codeword stored in register 42$_j$ corresponding to the reset value is transferred to another register (not shown) within logic block 44 prior to register 42$_j$ receiving the second codeword. Following the second sampling interval, the second codeword is also transferred to logic block 44, where the reset value corresponding to the first codeword is subtracted from the signal value corresponding to the second codeword to obtain an image datum with the reset level and noise removed. This completes the correlated double sampling operation, whereby errors due to transistor mismatches, offsets and noise are substantially eliminated in the final image data. The subtraction can be performed for all columns in parallel. Alternatively, the subtraction can be performed sequentially. Column select/scan logic 44 outputs the final image data corresponding to each pixel 30 in the array to image storage and processing electronics.

After signal read, photodiode 26 needs to be reset to a high potential before the next cycle of photocharge collection can begin. This is accomplished by raising the RESET signal at time $t_7$ high, while keeping the ROW SELECT and VR bus signals high. As such, reference node 25 will be high, and the photodiode is reset to a high potential since FET 22 is ON. Following this operation, ROW SELECT is brought low again at time $t_8$ to turn FET 22 OFF and isolate reference node 25 from photodiode 26, which begins another cycle of photocharge collection. RESET remains high and VR goes low at time $t_9$, thus inactivating source follower FET 23 and allowing FET 23 of other pixel rows to put signals on column bus 15$_j$. This is illustrated by waveform portions 35$_{i+1}$ and 36$_{i+1}$ representing the respective waveforms applied to the next row $R_{i+1}$.

If a pinned photodiode is used for the photosensitive element, the photocharge collected in the pinned photodiode can be completely transferred to reference node 25 without charge sharing. In the pinned photodiode case, the photodiode reset period is not necessary because the signal read results in complete charge transfer and the photodiode is reset as it is read.

Figure 7:
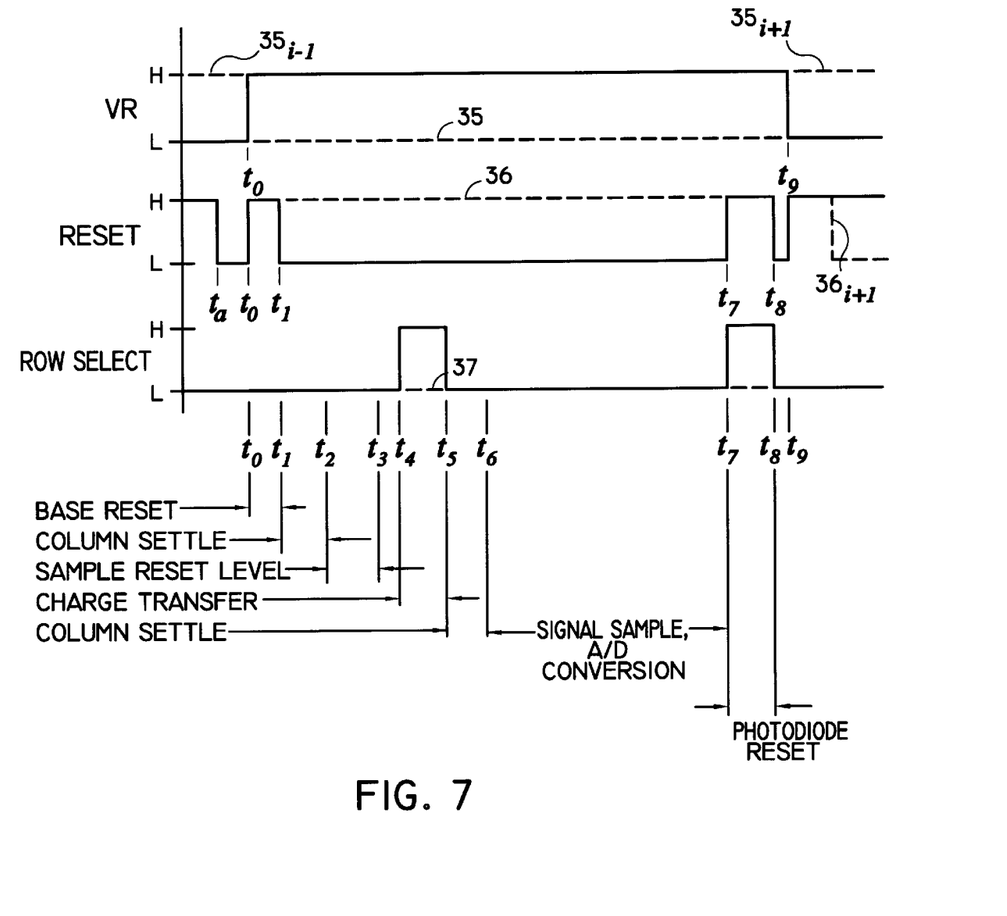

FIG. 7 illustrates a timing diagram of alternative waveforms for the RESET and ROW SELECT signals. Image sensor 20 can operate with either one or both of these waveforms applied as alternatives to those presented in FIG. 6. Referring first to the alternate RESET waveform, prior to onset of the reset period at time $t_0$, the RESET signal is brought low at time $t_a$ before raising VR. This approach reduces feedthrough from the RES line to the reference node 25 due to the gate to source capacitance of the reset FET 21. In addition, after the photodiode reset period, the RESET signal is brought low at time $t_8$ before VR goes low at time $t_9$. After VR goes low, the RESET signal has to be brought high again to hold reference node 26 to the low potential at VR so as to isolate the readout FET 23 from column bus 15 and allow the readout FETs of other pixel rows to put signals on the column bus.

Referring now to the alternate ROW SELECT waveform of FIG. 7, after ROW SELECT is brought high at time $t_4$ to transfer the photocharge to reference node 25, ROW SELECT is brought low at time $t_5$ before the second column settle period ($t_5$–$t_6$). ROW SELECT then remains low during the second sampling interval ($t_6$–$t_7$). This technique allows the clock coupling due to the row select FET 22 to be canceled before signal read. Such clock coupling would otherwise be present due to the parasitic gate to source capacitance of FET 22. The ROW SELECT signal is then brought high again during the photodiode reset period to allow the photodiode to be reset through FET 22 and FET 21.

While the above description contains many specifics, these specifics should not be construed as limitations on the scope of the invention, but merely as exemplifications of preferred embodiments thereof. For instance, it may be possible to utilize bipolar devices within the pixels as alternatives to FETS. Further, the invention is applicable to image sensors comprising only a single row, as opposed to a plurality of rows as described in detail above. Those skilled in the art will envision many other possible variations that are within the scope and spirit of the invention as defined by the claims appended hereto.

What is claimed is:

1. An image sensor, comprising:

a plurality of imager cells arranged in rows and columns, with the imager cells of any given column being coupled to a column data line of that column, and each imager cell being operable to selectively provide a first output on an associated column data line indicative of a reset level during a first sampling interval and to provide a signal output on the associated column data line during a second sampling interval indicative of an amount of light incident upon that imager cell, each said imager cell comprises a first transistor operative to selectively set a voltage level at a reference node, and a second transistor having a control terminal coupled to said reference node, and an output terminal coupled to the column data line of the column associated with the particular imager cell, said second transistor providing said first output indicative of potential of said reference node during said first sampling interval in which said first transistors is off, and said signal output indicative of potential of the amount of light incident upon that imager cell during said second sampling interval; and at least one analog to digital (A/D) converter coupled to said column data lines for converting at least said first output on each column data line to a first corresponding digital code, to enable a subsequent comparison with a second digital code associated with said signal output to complete a correlated double sampling operation.

2. The image sensor of claim 1 wherein said at least one A/D converter also converts said signal output provided during said second sampling interval to said second digital code, and said comparison with said second digital code being a subtraction of a value corresponding to said first digital code from a value corresponding to said second digital code.

3. The image sensor of claim 1 wherein said imager cells within a common row are simultaneously activated for outputting said first and second outputs on associated column data lines, and said at least one A/D converter receiving data from all column data lines simultaneously.

4. The image sensor of claim 1 wherein said at least one A/D converter comprises a plurality of A/D converters, each associated with one of said columns and connected to a corresponding one of said column data lines.

5. The image sensor of claim 4, further comprising a plurality of registers, each coupled to one of said A/D converters, for temporarily storing said first digital codes and subsequently transferring each of said first digital codes to subtraction circuitry for subtracting each of said first digital codes from a corresponding second digital code.

6. The image sensor of claim 1 wherein:

each imager cell includes a photosensitive element for providing a photocharge responsive to incident light, circuit means for selectively transferring the photocharge to a reference node within the imager cell, and a reset switch operable to selectively switch a supply voltage at a low logic slate to the reference node to isolate the reference node from the column bus; and said first sampling interval follows a shut-off of said reset switch to isolate the reference node from the supply voltage, and said first output is indicative of the reset level at said reference node when said reset switch is off.

7. The image sensor of claim 6, wherein said first sampling interval follows a predetermined column settle interval immediately following said shut-off of said reset switch.

8. The image sensor of claim 6, wherein a charge transfer interval follows said first sampling interval, a predetermined column settle interval immediately follows said charge transfer interval, and said second sampling interval immediately follows said column settle interval.

9. The image sensor of claim 1, including complementary metal oxide semiconductor (CMOS) circuitry for providing timing and control signals to the imager cells.

10. An image sensor, comprising:

a) a plurality of imager cells arranged in rows and columns, with the imager cells of any given column being coupled to a column data line of that column, and each imager cell being operable to selectively provide a first output on an associated column data line indicative of a reset level during a first sampling interval and to provide a signal output on the associated column data line during a second sampling interval indicative of an amount of light incident upon that imager cell, each said imager cell comprising:

i) a photosensitive element providing a photocharge responsive to incoming light;

ii) a first transistor coupled to a row select line carrying a row select signal to imager cells of a common row to selectively activate the imager cells of the common row for image data readout, said first transistor operable to transfer said photocharge towards a reference circuit node within said imager cell responsive to said row select signal;

iii) a second transistor operably coupled to said first transistor, said second transistor operative to selectively set a voltage level at said reference node; and iv) a third transistor having a control terminal coupled to said reference node, and an output terminal coupled to the column data line of the column associated with the particular imager cell, said third transistor providing said first output indicative of potential of said reference node during said first sampling interval in which said first and second transistors are both off, and said signal output indicative of potential of said reference node during said second sampling interval; and b) at least one analog to digital (A/D) converter coupled to said column data lines for converting said first and signal outputs on each column data line to first and second digital codes, respectively, to enable a subsequent comparison between the digital codes to complete a correlated double sampling operation.

11. The image sensor of claim 10 wherein said photosensitive element comprises a photodiode.

12. The image sensor of claim 10 wherein said photosensitive element comprises a pinned photodiode.

13. The image sensor of claim 10 wherein during said second sampling interval, said second transistor is on.

14. The image sensor of claim 10 wherein during said second sampling interval, said second transistor is off.

15. The image sensor of claim 10 wherein said first, second and third transistors of each imager cell are MOSFETs.

16. The image sensor of claim 10 wherein conducting terminals of said second and third transistors are connected to a common voltage supply line that supplies voltage to imager cells of a common row.

17. In an image sensor having a plurality of imager cells arranged in at least one row and a plurality of columns, with the imager cells of any given column being coupled to a column data line of that column, a method of performing correlated double sampling, comprising:

selectively activating a plurality of imager cells in a common row, each activated imager cell having a first transistor connected to a voltage reference and a second transistor, said second transistor operatively connected to an associated column data line for providing a first output on the associated column data line indicative of a reset level during a first sampling interval when said first transistor is off and providing a signal output on the associated column data line during a second sampling interval indicative of an amount of light incident upon that imager cell;

converting said first outputs on said column data lines to first digital codes; and storing said first digital codes to enable subsequent comparisons with corresponding second digital codes associated with said signal outputs to complete the correlated double sampling.

18. The method of claim 17, further comprising converting each said signal output into a corresponding said second digital code during said second sampling interval.

19. The method of claim 17, wherein said step of storing said first digital codes comprises storing said first digital codes in digital registers, and said method further comprising subtracting a value corresponding to said first digital code with a value corresponding to said second digital code to provide an image data output with reset noise removed.

* * * * *